(12) United States Patent
Manoukian et al.

(10) Patent No.: US 11,326,525 B2
(45) Date of Patent: May 10, 2022

(54) AIRCRAFT BLEED AIR SYSTEMS AND METHODS

(71) Applicant: PRATT & WHITNEY CANADA CORP., Longueuil (CA)

(72) Inventors: Patrick Manoukian, Saint-Laurent (CA); Philippe Beauchesne-Martel, Brossard (CA)

(73) Assignee: PRATT & WHITNEY CANADA CORP., Longueuil (CA)

(*) Notice: Subject to any disclaimer, the term of this patent is extended or adjusted under 35 U.S.C. 154(b) by 57 days.

(21) Appl. No.: 16/599,336

(22) Filed: Oct. 11, 2019

(65) Prior Publication Data

US 2021/0108571 A1    Apr. 15, 2021

(51) Int. Cl.
| | |
|---|---|
| *F02C 9/16* | (2006.01) |
| *F02C 7/18* | (2006.01) |
| *F02C 6/08* | (2006.01) |

(52) U.S. Cl.
CPC ............... *F02C 9/16* (2013.01); *F02C 6/08* (2013.01); *F02C 7/18* (2013.01)

(58) Field of Classification Search
CPC ..................................... F02C 6/08; F02C 9/18
See application file for complete search history.

(56) References Cited

U.S. PATENT DOCUMENTS

| | | | |
|---|---|---|---|
| 1,010,073 A | 11/1911 | Ream | |
| 2,786,331 A | 3/1957 | Williams | |
| 3,325,994 A | 6/1967 | Zaba et al. | |
| 3,851,464 A * | 12/1974 | Davis | F02C 9/38 60/39.281 |
| 3,869,862 A * | 3/1975 | Dickey | F02C 6/02 60/39.15 |

(Continued)

FOREIGN PATENT DOCUMENTS

| | | |
|---|---|---|
| CA | 2965946 | 3/2018 |
| CN | 207935063 U | 10/2018 |

(Continued)

OTHER PUBLICATIONS

John H. Perepezko, The Hotter the Engine, the Better, Nov. 20, 2009, AAAS, Science, www.sciencemag.org vol. 326, pp. 1068-1069. (Year: 2009).*

(Continued)

*Primary Examiner* — Todd E Manahan
*Assistant Examiner* — Marc J Amar
(74) *Attorney, Agent, or Firm* — Norton Rose Fulbright Canada (57) ABSTRACT

A method of monitoring bleed air provided from a first engine to a second engine of a multi-engine aircraft includes operating the first engine in a powered mode to provide motive power to the multi-engine aircraft; and when the first engine is in the powered mode: actuating an air valve to open an air flow path from a compressor section of the first engine to a plurality of parts of the second engine, after the step of actuating the air valve, determining a change in a temperature in a main gas path of the first engine at a location in the main gas path at or downstream of a combustor of the first engine, and in response to determining that the change is below a threshold, executing an action with respect to the first engine, the air valve, and/or the second engine.

8 Claims, 8 Drawing Sheets

(56) References Cited

U.S. PATENT DOCUMENTS

| | | |
|---|---|---|
| 4,083,181 A | 4/1978 | Adamson |
| 4,213,738 A | 7/1980 | Williams |
| 4,217,755 A | 8/1980 | Williams |
| 4,251,985 A | 2/1981 | Sullivan |
| 4,625,510 A * | 12/1986 | Evans ............... F02C 9/28 60/39.281 |
| 4,627,234 A | 12/1986 | Schuh |
| 4,741,164 A | 5/1988 | Slaughter |
| 4,900,231 A | 2/1990 | Kennedy |
| 5,018,601 A | 5/1991 | Waddington et al. |
| 5,161,364 A | 11/1992 | Bruun et al. |
| 5,429,208 A | 7/1995 | Largillier et al. |
| 5,553,449 A * | 9/1996 | Rodgers ............ F02C 7/12 60/204 |
| 5,553,461 A | 9/1996 | Hitzigrath et al. |
| 6,282,882 B1 | 9/2001 | Dudd, Jr. et al. |
| 6,344,949 B1 | 2/2002 | Albrecht et al. |
| 6,751,979 B2 | 6/2004 | Leathers |
| 6,792,746 B2 * | 9/2004 | Saito ............... F02C 1/02 60/224 |
| 6,845,606 B2 * | 1/2005 | Franchet ............ F02K 3/025 60/225 |
| 6,868,664 B2 * | 3/2005 | Albero ............. F02K 3/12 60/224 |
| 6,885,917 B2 | 4/2005 | Osder et al. |
| 6,921,244 B2 | 7/2005 | Johnson |
| 7,104,282 B2 | 9/2006 | Hooker et al. |
| 7,121,078 B2 * | 10/2006 | Turco ............... F01D 13/003 60/224 |
| 7,328,098 B1 | 2/2008 | VanderLeest et al. |
| 7,464,533 B2 * | 12/2008 | Wollenweber ...... F02C 6/02 60/39.15 |
| 7,584,618 B2 | 9/2009 | Amiot et al. |
| 7,584,619 B2 | 9/2009 | Granitz et al. |
| 7,797,962 B2 | 9/2010 | Kresser et al. |
| 7,843,354 B2 | 11/2010 | Holt et al. |
| 7,861,536 B2 | 1/2011 | Alecu et al. |
| 7,959,109 B2 | 6/2011 | Dasilva et al. |
| 7,980,052 B1 * | 7/2011 | Paulino ............ F02C 3/22 60/39.15 |
| 8,245,493 B2 | 8/2012 | Minto |
| 8,453,462 B2 * | 6/2013 | Wichmann ......... F02C 9/42 |
| 8,511,058 B2 * | 8/2013 | Agrawal ........... F02C 3/13 |
| 8,529,189 B2 | 9/2013 | Brown et al. |
| 8,778,091 B1 | 7/2014 | Lockyer |
| 8,967,528 B2 | 3/2015 | Mackin et al. |
| 9,068,463 B2 | 6/2015 | Pandey et al. |
| 9,068,465 B2 | 6/2015 | Pandey et al. |
| 9,205,927 B2 | 12/2015 | Shepard et al. |
| 9,222,578 B2 | 12/2015 | Long |
| 9,279,341 B2 | 3/2016 | Durocher et al. |
| 9,297,304 B2 * | 3/2016 | Nordstrom .......... F02C 3/14 |
| 9,359,949 B2 | 6/2016 | Olivarez et al. |
| 9,611,947 B2 | 4/2017 | Hallisey et al. |
| 9,624,831 B2 | 4/2017 | Brousseau et al. |
| 9,631,512 B2 | 4/2017 | Lockyer |
| 9,810,158 B2 | 11/2017 | Foutch et al. |
| 9,902,500 B2 | 2/2018 | Stadler et al. |
| 9,903,221 B2 | 2/2018 | Jacobs et al. |
| 9,995,222 B2 | 6/2018 | Schwarz et al. |
| 10,054,051 B2 | 8/2018 | Foutch et al. |
| 10,060,358 B2 | 8/2018 | Tiwari et al. |
| 10,100,744 B2 | 10/2018 | Mackin et al. |
| 10,107,206 B2 | 10/2018 | Forcier et al. |
| 10,125,691 B2 | 11/2018 | Feulner et al. |
| 10,138,812 B2 | 11/2018 | Heaton et al. |
| 10,155,592 B2 | 12/2018 | McAuliffe et al. |
| 10,293,945 B2 | 5/2019 | Hoffjann et al. |
| 10,415,468 B2 | 9/2019 | Ackermann et al. |
| 10,451,491 B2 | 10/2019 | Chapman |
| 10,458,267 B2 | 10/2019 | Gibson et al. |
| 10,458,278 B2 | 10/2019 | Avis et al. |
| 10,461,348 B2 | 10/2019 | Im et al. |
| 10,487,751 B2 | 11/2019 | DiBenedetto |
| 10,508,601 B2 | 12/2019 | Sheridan et al. |
| 10,563,590 B2 | 2/2020 | Coldwate et al. |
| 10,569,887 B2 | 2/2020 | Valiquette et al. |
| 2002/0189230 A1 * | 12/2002 | Franchet ............ F02K 3/075 60/204 |
| 2003/0131585 A1 * | 7/2003 | Saito ............... F02K 3/075 60/226.1 |
| 2004/0168427 A1 * | 9/2004 | Truco ............... F02C 6/08 60/226.1 |
| 2006/0123796 A1 | 6/2006 | Aycock et al. |
| 2007/0289285 A1 | 12/2007 | Jorn |
| 2010/0058731 A1 | 3/2010 | Haehner et al. |
| 2010/0326085 A1 | 12/2010 | Veilleux |
| 2011/0271687 A1 * | 11/2011 | Nordstrom .......... F02C 3/14 60/785 |
| 2012/0023962 A1 * | 2/2012 | Wichmann ......... F02C 6/18 60/771 |
| 2012/0139370 A1 * | 6/2012 | Pal ................. H02K 5/20 310/54 |
| 2012/0240588 A1 * | 9/2012 | Patel ............... F02C 9/26 60/772 |
| 2012/0304663 A1 | 12/2012 | Weber et al. |
| 2013/0040545 A1 | 2/2013 | Finney |
| 2013/0174574 A1 | 7/2013 | Heaton et al. |
| 2014/0366547 A1 | 12/2014 | Kraft et al. |
| 2016/0003144 A1 * | 1/2016 | Kupratis ............ F02C 6/18 60/771 |
| 2016/0123237 A1 * | 5/2016 | Spagnoletti ......... F16K 27/04 60/776 |
| 2016/0273393 A1 * | 9/2016 | Ekanayake ......... F01K 23/10 |
| 2016/0332737 A1 | 11/2016 | Sabnis et al. |
| 2016/0369695 A1 | 12/2016 | Perlak et al. |
| 2017/0016399 A1 * | 1/2017 | Bedrine ............ B64D 27/10 |
| 2017/0106985 A1 | 4/2017 | Stieger et al. |
| 2017/0191419 A1 * | 7/2017 | Bayraktar ........... F02C 7/125 |
| 2017/0210478 A1 | 7/2017 | Mackin |
| 2017/0268431 A1 | 9/2017 | Schwarz |
| 2017/0298836 A1 * | 10/2017 | Tiwari ............. F04D 27/0215 |
| 2017/0335772 A1 | 11/2017 | Coldwate et al. |
| 2017/0369180 A1 | 12/2017 | Jones et al. |
| 2018/0010520 A1 | 1/2018 | Iwasaki et al. |
| 2018/0022463 A1 | 1/2018 | Teicholz et al. |
| 2018/0045115 A1 | 2/2018 | Glann et al. |
| 2018/0058336 A1 * | 3/2018 | Munevar ........... F02C 7/268 |
| 2018/0073428 A1 * | 3/2018 | Morgan ............ F02C 3/067 |
| 2018/0080378 A1 * | 3/2018 | Alecu .............. F02C 9/42 |
| 2018/0080380 A1 | 3/2018 | Simonetti |
| 2018/0093778 A1 | 4/2018 | Spack et al. |
| 2018/0128176 A1 | 5/2018 | Staubach et al. |
| 2018/0135525 A1 | 5/2018 | Morgan et al. |
| 2018/0334918 A1 | 11/2018 | Ortiz et al. |
| 2019/0010876 A1 | 1/2019 | Deroy et al. |
| 2019/0032574 A1 | 1/2019 | Maguire et al. |
| 2019/0063324 A1 | 2/2019 | Gould et al. |
| 2019/0232497 A1 | 8/2019 | Tall et al. |
| 2019/0283887 A1 | 9/2019 | Ernst et al. |
| 2019/0309683 A1 | 10/2019 | Mackin et al. |
| 2019/0368417 A1 * | 12/2019 | Terwilliger ........ F02C 3/13 |
| 2019/0383167 A1 | 12/2019 | Schwarz et al. |
| 2019/0383220 A1 | 12/2019 | Mackin |
| 2020/0032702 A1 * | 1/2020 | Kupratis ........... F02C 3/064 |
| 2020/0095931 A1 | 3/2020 | Vinski |
| 2020/0248627 A1 | 8/2020 | Amari |

FOREIGN PATENT DOCUMENTS

| | | |
|---|---|---|
| EP | 1923575 | 5/2008 |
| EP | 2267288 | 12/2010 |
| EP | 2407652 A1 | 1/2012 |
| EP | 3095703 | 11/2016 |
| EP | 3282094 | 2/2018 |
| EP | 3318727 | 5/2018 |
| EP | 3323727 | 5/2018 |
| WO | 2012007341 A1 | 1/2012 |

(56) References Cited

FOREIGN PATENT DOCUMENTS

| WO | 2013154630 | 10/2013 |
| WO | 2014033220 A1 | 3/2014 |

OTHER PUBLICATIONS

V. S. Kuz'michev, V. N. Rybalko, A. Y. Tkachenko and I. N. Krupenich, Optimization of Working Process Parameters of Gas Turbine Engines Line on the Basis of Unified Engine Core, ARPN Journal of Engineering and Applied Sciences, vol. 9, No. 10, Oct. 2014, ISSN 1819-6608, p. 1877. (Year: 2014).*
European Search Report issued in Application No. 20165886.1 dated Aug. 17, 2020.
The PW1OO Engine: 20 Years of Gas Turbine Technology Evolution, E. Hosking, D. P. Kenny, R. I. McCormick S. H. Moustapha, P. Sampath, A. A. Smailys, presented at the RTO AVT Symposium on "Design Principles and Methods for Aircraft Gas Turbine Engines", held in Toulouse, France, May 11-15, 1998, and published in RTO MP-8—relevant section : p. 4-7, col. 2, lines 5-12.
European Search Report dated Feb. 11, 2021 for Application No. 20166019.8.
European Search Report dated Jun. 10, 2021 for Application No. 20201413.0.

* cited by examiner

FIG-4

AIRCRAFT BLEED AIR SYSTEMS AND METHODS

TECHNICAL FIELD

The disclosure relates to aircraft bleed air systems and methods.

BACKGROUND

Bleed air produced by a gas turbine engine is compressed air from the compressor stage that is used for engine functions (such as cooling of turbines and to help seal bearing cavities, for example) and is also used for aircraft functions (such as engine starting, anti-icing, cabin pressure, cabin heating, pneumatic systems, pressurizing liquid tanks, etc.). Engine bleed air can be derived from the high pressure or the low pressure compressor stage, depending on the air pressure and temperature requirements and the engine operating condition. Low pressure stage air is typically used during high power engine operation, and high pressure stage air may be used during descent and other low power engine operations.

Bleed air may be used within an engine for engine functions such as bearing cavity sealing and cooling of various engine components. While existing bleed air systems may be suitable for their intended purposes, improvement to the prior art is desirable.

SUMMARY

There is accordingly provided a method of monitoring bleed air provided from a first engine of a multi-engine aircraft to a second engine of the multi-engine aircraft, the method comprising: operating the first engine in a powered mode to provide motive power to the multi-engine aircraft; and when the first engine is in the powered mode: actuating an air valve to open an air flow path from a compressor section of the first engine to a plurality of parts of the second engine, after the step of actuating the air valve, determining a change in a temperature in a main gas path of the first engine at a location in the main gas path at or downstream of a combustor of the first engine, and in response to determining that the change is below a threshold, executing an action with respect to the first engine, the air valve, and/or the second engine.

In some embodiments, the action includes actuating the air valve to fluidly seal the air flow path.

In some embodiments, the action includes generating an indication that the air valve is in a malfunction state.

In some embodiments, the action is a first action, and the method includes, in response to determining that the change meets the threshold, executing a second action with respect to at least one of the first engine, the air valve, and the second engine, the second action being different from the first action.

In some embodiments, the second action includes generating an indication that the air valve is in a functional state.

In some embodiments, the second action includes operating the second engine in a standby mode to provide less motive power to the aircraft than the first engine operating in the powered mode.

In some embodiments, the step of determining the change in the temperature includes determining the temperature prior to the step of actuating the air valve, determining the temperature after the step of actuating the air valve, and determining the change as a difference between the temperatures determined before and after the step of actuating the air valve.

In some embodiments, the first engine is a gas turbine engine and the temperature is an inter-turbine temperature of the gas turbine engine.

In another aspect, there is provided a method of determining a state of a switching valve of a compressed air switching system of a gas turbine engine of an aircraft, the method comprising: when the gas turbine engine is operating, bleeding air via the compressed air switching system to a plurality of parts of the gas turbine engine from one of: a first bleed location of a compressor section of the gas turbine engine, and a second bleed location that is downstream of the first bleed location relative to air flow through the compressor section; determining a temperature in a main gas path of the gas turbine engine at a location at or downstream of a combustor of the gas turbine engine and then actuating the switching valve of the compressed air switching system to bleed air from the other one of the first and second bleed locations; determining the temperature of the gas turbine engine after the step of actuating the switching valve; and in response to determining that a difference between the temperatures before and after the step of actuating the switching valve meets a threshold, executing at least one of a first action with respect to at least one of the gas turbine engine and the switching valve, and else executing a second action with respect to the at least one of the gas turbine engine and the switching valve, the second action being different from the first action.

In some embodiments, the operating the gas turbine engine includes operating the gas turbine engine in one of a powered mode to a standby mode, when the gas turbine engine is operating in the powered mode, the step of bleeding air is from the first bleed location, and when the gas turbine engine is operating in the standby mode, the step of bleeding air is from the second bleed location.

In some embodiments, when the gas turbine engine is operating in the powered mode, the first action includes one of: switching the gas turbine engine to the standby mode in response to a command from an operator of the aircraft to switch the gas turbine engine to the standby mode, and allowing a switch of the gas turbine engine to the standby mode in response to the command.

In some embodiments, when the gas turbine engine is operating in the powered mode, the second action includes preventing the gas turbine engine from switching to the standby mode in response to the command.

In some embodiments, the first action includes generating an indication that the switching valve is in a functional state.

In some embodiments, the second action includes generating an indication that the switching valve is in a malfunction state.

In some embodiments, the temperature is an inter-turbine temperature of the gas turbine engine.

In yet another aspect, there is provided a multi-engine aircraft comprising: a first gas turbine engine for providing a first engine power output; and a second gas turbine engine for providing a second engine power output, the second gas turbine engine having a bleed air system and a compressed air switching system including: an switching valve having: a low pressure inlet in communication with a first bleed location in a compressor section of the second gas turbine engine; a high pressure inlet in communication with a second bleed location in the compressor section, the second bleed location being downstream of the first bleed location relative to main gas flow through the compressor section;

and a switch outlet in communication with the bleed air system, the switching valve displaceable between at least first and second positions, the first position interconnecting the lower pressure inlet and the switch outlet, and the second position interconnecting the high pressure inlet and the switch outlet; and a control system configured to: actuate the switching valve between the first and second positions, determine a temperature change in a main gas path of the second gas turbine engine resulting from the switching valve being displaced from one of the first and second positions to the other one of the first and second positions, determine whether the temperature change meets a threshold, and in response to determining that the temperature change meets the threshold, execute an action with respect to the first gas turbine engine, the second gas turbine engine, and/or the switching valve.

In some embodiments, the action includes switching the second engine between a powered mode and a standby mode.

In some embodiments, the control system is configured to: receive a command for from an operator of the multi-engine aircraft, the command requesting the switching the second engine between the powered mode and the standby mode; determine whether the temperature change meets the threshold in response to receiving the command; and execute the action in response to determining that the temperature change meets the threshold.

In some embodiments, the temperature is an inter-turbine temperature of the gas turbine engine.

In some embodiments, the control system is configured to prevent the switching the second engine between the powered mode and the standby mode in response to determining that the temperature change is below the threshold.

Further details of these and other aspects of the subject matter of this application will be apparent from the detailed description included below and the drawings.

BRIEF DESCRIPTION OF THE DRAWINGS

FIG. 3 is the schematic axial cross-sectional view of FIG. 2, showing the air switching system of the present disclosure;

DETAILED DESCRIPTION

Figure 1A:
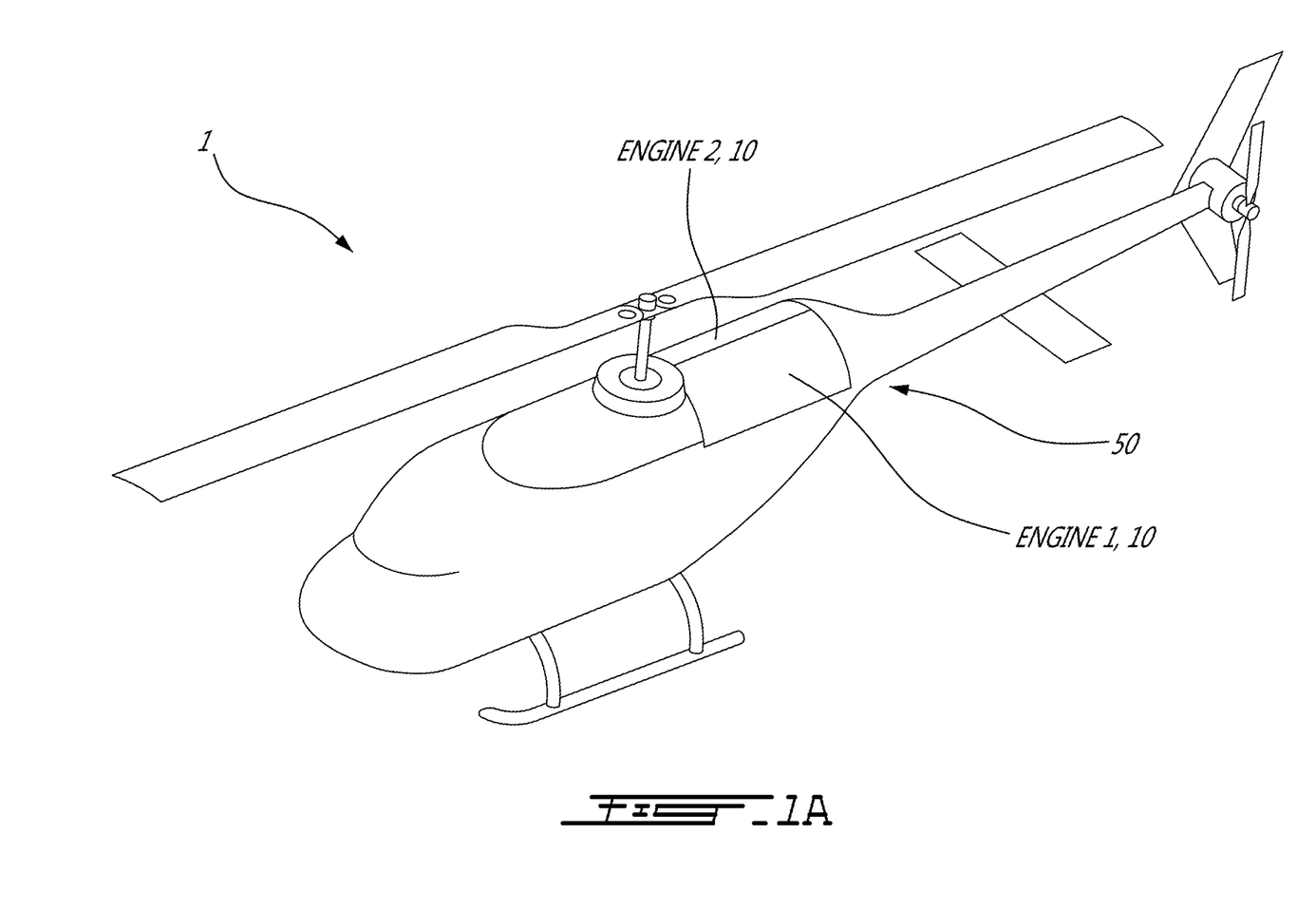
FIG. 1A is a schematic view of a multi-engine aircraft.

FIG. 1A depicts an exemplary multi-engine aircraft 1, which in this case is a helicopter. The aircraft 1 may however also be a fixed-wing aircraft. The aircraft 1 includes at least two gas turbine engines 10, labeled in FIG. 1A as "ENGINE 1" and "ENGINE 2". These two engines may be interconnected, in the case of the depicted helicopter application, by a common gearbox to form a multi-engine system 50 as shown in FIG. 1B.

Figure 1B:
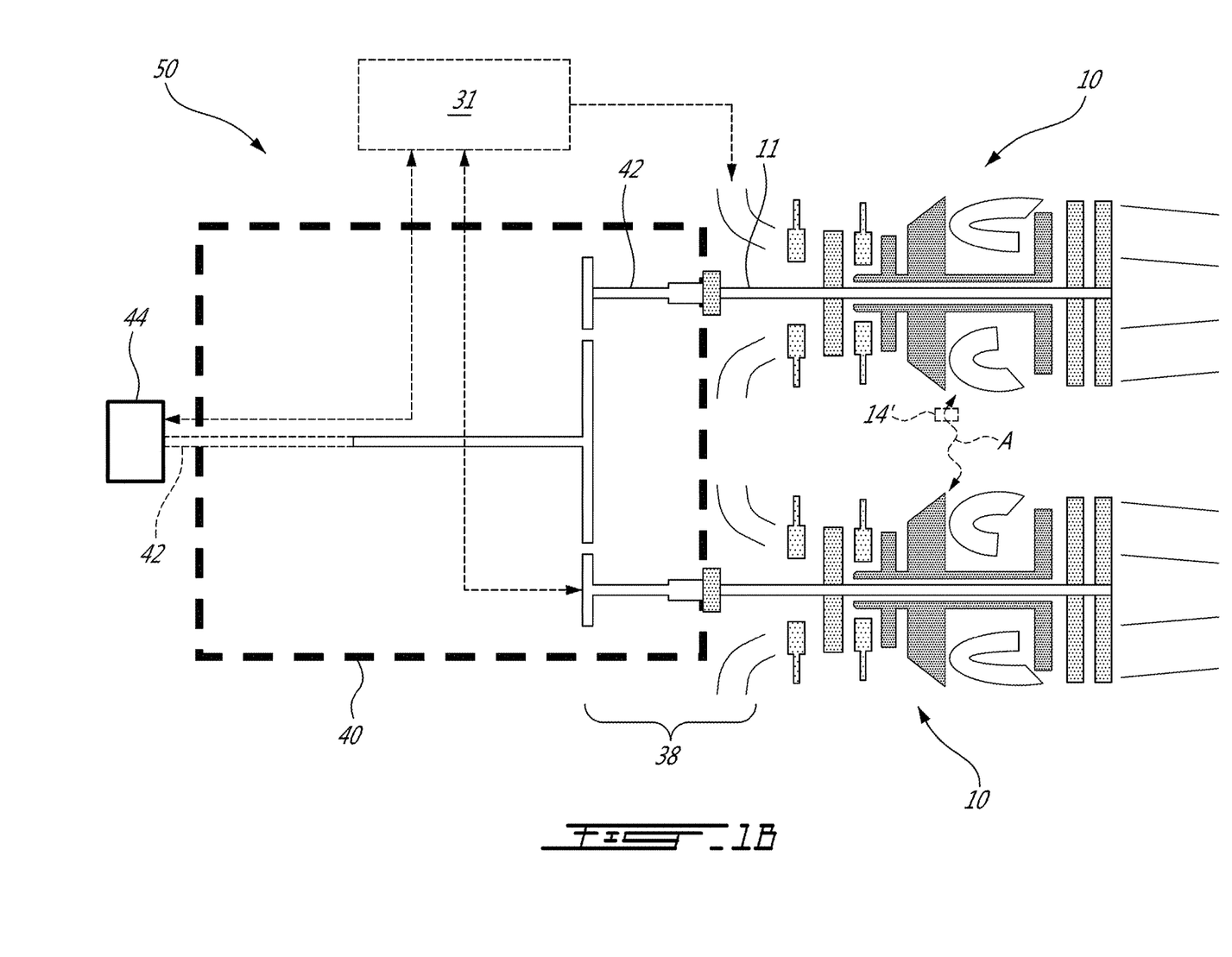
FIG. 1B is a schematic representation of an exemplary multi-engine system for the aircraft of FIG. 1A, showing axial cross-sectional views of two gas turbine engines.

FIG. 1B illustrates a schematic representation of an exemplary multi-engine system 50 that may be used as a power plant for the aircraft 1. The multi-engine system 50 comprises two or more gas turbine engines 10. The multi-engine system 50 may manage the operation of the engines 10, as will be described in further detail below. The multi-engine system 50 may be used as a dual engine powerplant for an aircraft, such as a helicopter. In addition to airborne applications, the multi-engine system 50 may be used in marine and/or industrial applications.

More particularly, the multi-engine system 50 of this embodiment includes first and second turboshaft engines 10 each having a respective transmission 38 which are interconnected by a common output gearbox 40 to drive a common load 44. In one embodiment, the common load 44 may comprise a rotary wing of a rotary-wing aircraft. For example, the common load 44 may be a main rotor of the helicopter 1. Depending on the type of the common load 44 and on the operating speed thereof, each of turboshaft engines 10 may be drivingly coupled to the common load 44 via the output gearbox 40, which may be of the speed-reduction type.

For example, the gear box 40 may have a plurality of transmission shafts 42 to receive mechanical energy from respective output shafts 11 of respective turboshaft engines 10. The gear box 40 may be configured to direct at least some of the combined mechanical energy from the plurality of the turboshaft engines 10 toward a common output shaft 42 for driving the common load 44 at a suitable operating (e.g., rotational) speed. It is understood that the multi-engine system 50 may also be configured, for example, to drive accessories and/or other elements of an associated aircraft. As will be described, the gear box 40 may be configured to permit the common load 44 to be driven by either of the turboshaft engines 100 or, by a combination of both engines 10 together.

Figure 2:
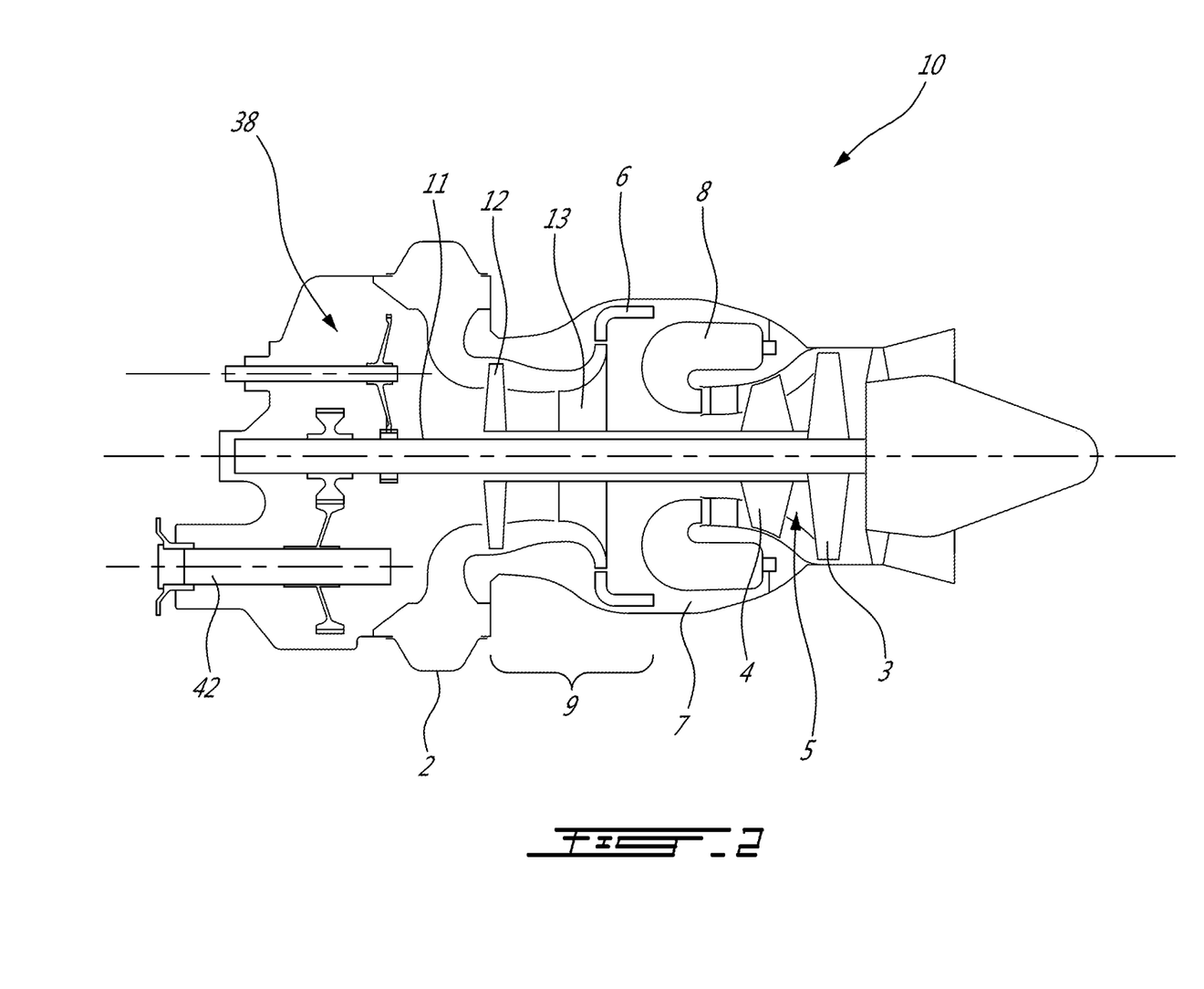
FIG. 2 is a schematic axial cross-sectional view of one of the gas turbine engines of FIG. 1B, for the multi-engine aircraft of FIG. 1A.

Referring now to FIG. 2, the gas turbine engine 10 is of a type provided, in one embodiment, for use in subsonic flight, generally comprising in serial flow communication a compressor section 9 for pressurizing the air, a combustor 8 in which the compressed air is mixed with fuel and ignited for generating an annular stream of hot combustion gases, and a turbine section 5 for extracting energy from the combustion gases.

The engine 10 depicted in FIG. 2 is a turboshaft gas turbine engine, and therefore includes a reduction gearbox and transmission 38 with an output shaft 42 which is configured to provide power output from the engine 10 to the common aircraft gearbox 40 of the multi-engine system 50 of FIG. 1B. However, it is to be understood that the present disclosure may also be applicable to other types of gas turbine engines, including turboprops and turbofans for example.

Referring still to FIG. 2, the gas turbine engine 10 includes an air inlet 2 via which air enters the engine 10 before being directed into the compressor section 9 of the engine. In the depicted embodiment, the compressor section 9 includes a low-pressure axial compressor 12 and a high-pressure centrifugal compressor 13. Compressed air exits the high pressure compressor 13 through a diffuser 6 and is contained within a plenum 7 that surrounds the combustor 8.

Fuel is supplied to the combustor 8 through fuel nozzles fed by a fuel system, wherein the injected fuel from the fuel nozzles is mixed with the compressed air within the combustor 8 thereby causing the fuel-air mixture to be ignited within the combustion chamber.

A portion of the compressed air within the plenum 7 is therefore admitted into the combustor 8 through orifices in the side walls to create a cooling air curtain along the combustor walls. A portion of the compressed air is also is used as bleed air for pneumatic systems within and/or external to the engine. The annular stream of hot combustion gases exiting the combustor 8 is directed to a downstream turbine section 5 for extracting energy from the combustion gases before exiting the engine as exhaust. The turbine section 5 may include one or more turbine rotors. In the embodiment of FIG. 2, a high pressure turbine 4 drives a high pressure engine shaft to which both the low and high pressure compressors 12 and 13 are connected for driving same, and a low pressure turbine 3 drives a low pressure turbine shaft which is coaxial with the low pressure engine shaft and drives the power output shaft 11, and the gearbox 38, of the engine 10.

Figure 4:
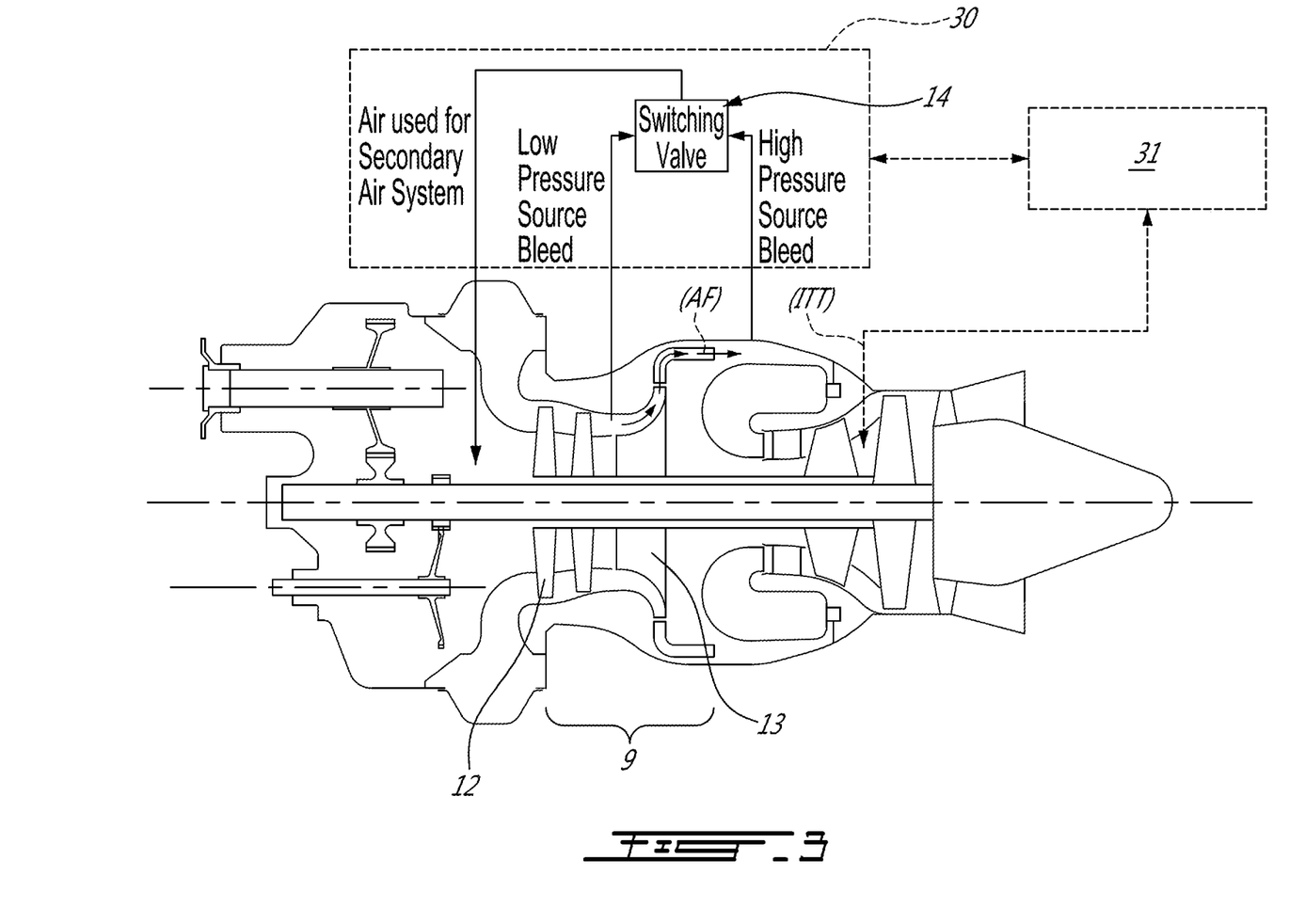
FIG. 4 is an enlarged axial cross-section view of the compressor section of the gas turbine engine of FIG. 2, showing the air system switching system of FIG. 3 operating in a first mode.
Figure 5:
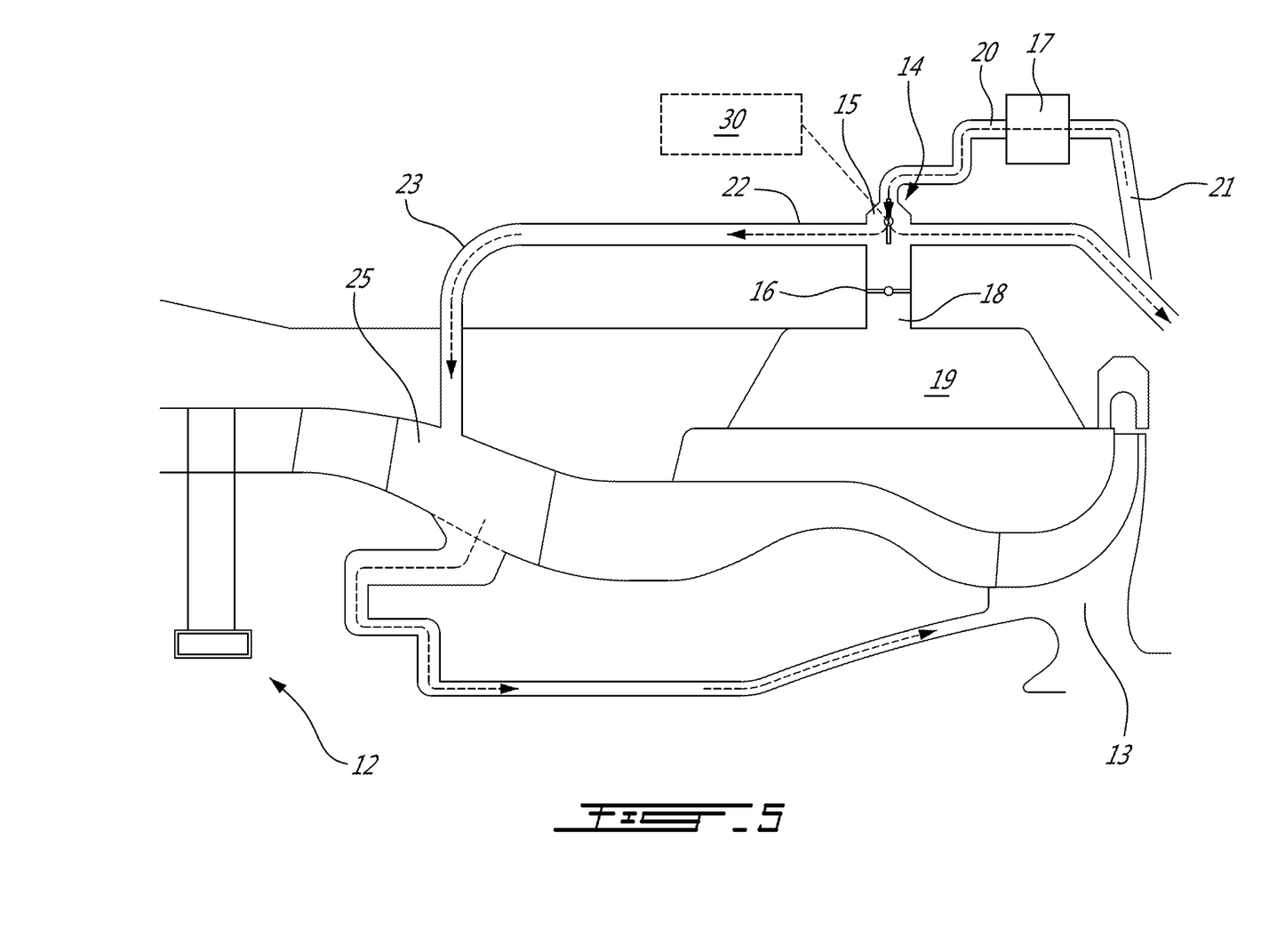
FIG. 5 is an enlarged axial cross-section view of the compressor section of the gas turbine engine of FIG. 2, showing the air system switching system of FIG. 3 operating in a second mode.

As will now be described in further detail, FIGS. 3 to 5 show axial sectional views of the compressor section 9 of the gas turbine engine 10, in particular the low pressure axial compressor(s) 12 and high pressure centrifugal compressor 13. While the exemplary embodiment includes an axial compressor and a centrifugal compressor, it is to be understood that other configurations (e.g. two or more axial compressors, two or more centrifugal compressors, a different combination of the two, etc.) is also possible.

The present description relates generally to operating a multi-engine aircraft 1, where a first engine of the gas turbine engines 10 is capable of providing motive power in flight to the aircraft 1 when operating in a "powered mode", and a second engine of the gas turbine engines 10 can be switched between a powered mode, whereby the second engine also provides motive power to the aircraft, and a lower-power "standby mode", whereby substantially no (or very little) motive power is provide to the aircraft.

The second engine may therefore be switched into, and maintained in, this very low-power standby mode during flight. The low-power standby mode of the second engine includes, but is not limited to a significantly reduced power mode or a so-called "sub-idle" mode in this example. By operating the second engine in this standby mode during flight, fuel consumption of the second engine, and therefore over the overall powerplant, is reduced. The second engine however remains able to return to normal operational power (e.g. full power) if additional power needed by the aircraft.

The first engine 1 as described herein may be referred to as a "main" or "primary" engine, and the second engine 2 may be referred to herein as a "reserve" engine. However, it is to be understood that both are capable of operating a full power if desired/necessary.

As seen in FIGS. 3 to 5, at least the second engine 10 of the aircraft 1 has a compressed air switching system 30 that comprises and is in communication with a switching valve 14. The switching valve 14 may also be referred to herein as an "input selector switch" 14. The compressed air switching system 30 may be controlled by the engine control system 31, such as a full-authority digital engine control (FADEC) system for example. In the example illustrated the input selector switch 14 has three main components, namely, a manifold 15, a check valve 16, and a solenoid valve 17. The manifold 15 has a low pressure inlet 18 including the check valve 16 in communication with a low pressure air plenum 19. The manifold 15 has a high pressure inlet 20 including the solenoid valve 17 in communication with a high pressure air conduit 21, derived from the output of the high pressure centrifugal compressor 13. The manifold 15 conveys low or high pressure air via a manifold outlet 22 in communication with a bleed air system 27 of the engine 10 and aircraft 1. The bleed air system 27 supplies bleed air that it receives from the compressor section 9 to a plurality of parts of the engine 10, such as to various bearing and/or seal cavities, etc. The particular parts that the bleed air system 27 may be configured to provide with bleed air may depend on each particular embodiment of the bleed air system 27 and/or the engine 10 and/or the aircraft 1. In some embodiments, the bleed air system 27 may be conventional.

In the example shown, the combination of the manifold 15, check valve 16, and solenoid valve 17 form the switching valve 14. Other configurations of switching valve 14 will be apparent to those skilled in the art including a poppet valve, a sliding spool valve or a ball valve.

FIG. 4 shows the switching valve 14, and thus the compressed air switching system 30, in the powered (or "motive") mode and a powered position, respectively, where the solenoid valve 17 is closed and the check valve 16 is open, thereby connecting the low pressure inlet 18 and the switch outlet 22. In the powered/motive mode of FIG. 4, the low pressure air from the plenum 19 is provided through the manifold 15 into the switch outlet 22.

FIG. 5 shows the switching valve 14, and thus the compressed air switching system 30, in the standby mode and a standby position, respectively, where the solenoid valve 17 is open and the check valve 16 is closed, thereby connecting the high pressure inlet 20 and the switch outlet 22. In the standby mode of FIG. 5, the high pressure air from the high pressure air conduit 21 is provided through the manifold 15 into the switch outlet 22.

As shown in FIG. 4 when the switching valve 14 is in the powered mode, low pressure compressed air is provided to the bleed air system (i.e. the secondary air system) for an engine operation system via the switch outlet 22. A compressed air passage 23 from the switch outlet 22 leads to an engine shaft 24 wherein the compressed air passage 23 passes through a stationary strut 25 within the gas path.

However when the engine speed is lowered to a level at or below idle, such as during "sub-idle" operation, the pressure of compressed air available from the low pressure plenum 19 may be insufficient for engine operations such as engine cooling and maintaining oil seals for the bearing cavities within this engine (i.e. the second engine). "Sub-idle" operation in this sense is understood to mean that the second engine is operating at a bare minimum speed to remain in operation, but engine speed and/or power output may be even lower than in a traditional "idle" operating state. In such sub-idle operations, the switching valve 14 is moved to the standby mode shown in FIG. 5 (i.e. solenoid valve 17 is open and the check valve 16 is closed). In the standby mode of FIG. 5, the high pressure air from the high pressure air conduit 21 is provided through the manifold 15 to the engine operating system to cool the turbines 11, and maintain oil seals with compressed air of sufficiently high pressure.

When the input selector switch 14 is in the powered mode of FIG. 4, the engine is operating in a normal flight condition at high power levels to provide a relatively high degree of motive power to the aircraft. During the powered mode, a relatively high quantity of compressed bleed air is provided from the low pressure air plenum 19. The bleed air in the powered mode is provided to the aircraft operation system at sufficient pressure and quantity for aircraft functions such as cabin pressurization, engine starting, pneumatic systems etc. as well as for the engine operating system to maintain engine functions such as cooling the turbines 11 and maintaining oil seals.

When the switching valve is in the standby mode of FIG. 5, a relatively low degree of motive power, or substantially no motive power, is provided to the aircraft and a relatively low quantity of aircraft bleed air is provided for the aircraft operation requirements.

During the standby mode, the available compressed air is diverted to essential engine functions and is not consumed by aircraft operations. In the standby mode, the second engine power output is less than the first engine power output. In one embodiment, the first engine provides at least 2 times more power output than the second engine. The second engine power output may also be such that a power differential, i.e. a difference between the first engine power and the second engine power, as a percentage of the first engine power, is at least 20%. This differential power between the two engines may however be much greater, for example 40%, 60%, 90%, 95% or greater. Accordingly, in certain embodiments, the power output differential is between 20-95%, or alternately between 40-95%, or alternately still greater than 90%. For example, in some embodiments, the standby engine may be decoupled from the main transmission to provide zero motive power to the aircraft, and in such cases the power output differential is 100%.

In some embodiments, the gas generator speed of the second engine, sometimes referred to as Ng, may however not correspond to the reduced power output of the second engine. The power output of the engine may be controlled by other means, such as by controlling variable guide vanes, and thus the gas generator speed of the second engine may be controlled in some embodiments and/or applications to approach that of the first engine during operation for example, even when the above-noted power output differentials remain.

To operate the solenoid valve 17, the solenoid valve 17 is in electric communication with the engine control system 31 that includes sensing the second engine power output and the first engine power output. A comparison is made and a motive power output differential is determined. When the motive power output differential is below a threshold value the control system 31 communicates an open signal to the solenoid actuated valve 17.

When the motive power output differential is reduced below the threshold value, the solenoid valve 17 is actuated to raise the manifold air pressure in the manifold 15 above the air pressure of the low pressure air source 19 which automatically closes the (normally open) one way check valve 16. As a result the switching valve 14 is switched between the powered mode and the standby mode depending on the signal received from the control system 31 and power output sensors.

The control system 31 can control the second engine power output by controlling a plurality of variable guide vanes. While controlling the second engine operation during the standby mode, the rotational speed of the second engine can be maintained in the range of 40-70% of the rotational speed of the first engine, while controlling the variable guide vanes to increase or decrease the second engine power output.

Therefore in two possible modes, low motive power (standby mode) and high motive power (powered mode), the method of operating the multi-engine aircraft during flight provides adequate compressed air to the second engine for the engine operation system uses, for example to actuate an air pressure operated oil retention seal, to cool an air cooled engine component, or to cool a turbine. Depending on the most efficient available source of compressed air, the switching valve 14 receives air from the low pressure air plenum 19 or the high pressure air conduit 21.

Accordingly, the present description provides a method of operating an aircraft propulsion gas turbine engine in a multi-engine aircraft, by operating at least one second engine in a powered mode to provide motive power in flight to the aircraft and supplying compressor pressure bleed air to the engine and aircraft, and while in flight operating the second engine in an standby mode to provide little or no motive power to the aircraft, switching to higher pressure bleed air source to provide second engine bleed air while substantially ceasing to supply bleed air to the aircraft.

In particular embodiments, the present disclosure includes a method of operating a gas turbine engine including supplying "P2.X" air to pressurize seals and, when engine speed drops below a threshold, switching to higher pressure air source. An air switching system for a secondary air system of a gas turbine engine is therefore provided, which may include a solenoid operated shut off valve, which actuates to switch between first and second bleed air sources, and a check valve. The solenoid valve can be opened and closed, to respectively permit or block higher pressure air (e.g. "P3" air) from being directed to the compressor cavities for cooling and/or sealing purposes. When the engine is operating normally in a powered mode, the solenoid valve is closed and the check valve is open, thereby permitting lower pressure air (e.g. "P2.8" air) to be fed to the compressor cavities for sealing and/or cooling purposes. When the engine is operating in a standby mode with a lower power/speed range (e.g. a "sub-idle" operation as described herein), the solenoid valve is open and the check valve is closed, thereby forcing the higher pressure P3 air to be fed to the compressor cavities for sealing and/or cooling purposes. Accordingly, higher pressure P3 air can be used during sub-idle engine conditions in order to ensure proper engine operation, and switching between the two air system configurations is possible when desired due to the solenoid driven switching valve. Thus, at each given engine operating condition, the lowest pressure air source that is sufficient to ensure optimal engine operation at that operating condition can be selected by the present air switching system. This may be done for various different engine operating ranges/conditions, to ensure optimal engine operation.

In another aspect, the present technology further provides methods of determining a state, such as a functioning state or a malfunction state, of the switching valve 14. In some embodiments, these methods may be applied to other types of valves in aircraft, and in methods of operating multi-engine aircraft for example, as described next. As a non-limiting example, the control system 31 may be configured to execute the methods or at least one or more of the steps thereof. It is contemplated that any suitable combination of controllers, sensors and programming of the control system 31 for example, may be used to suit each embodiment and application of the methods and sequences thereof.

Figure 6:
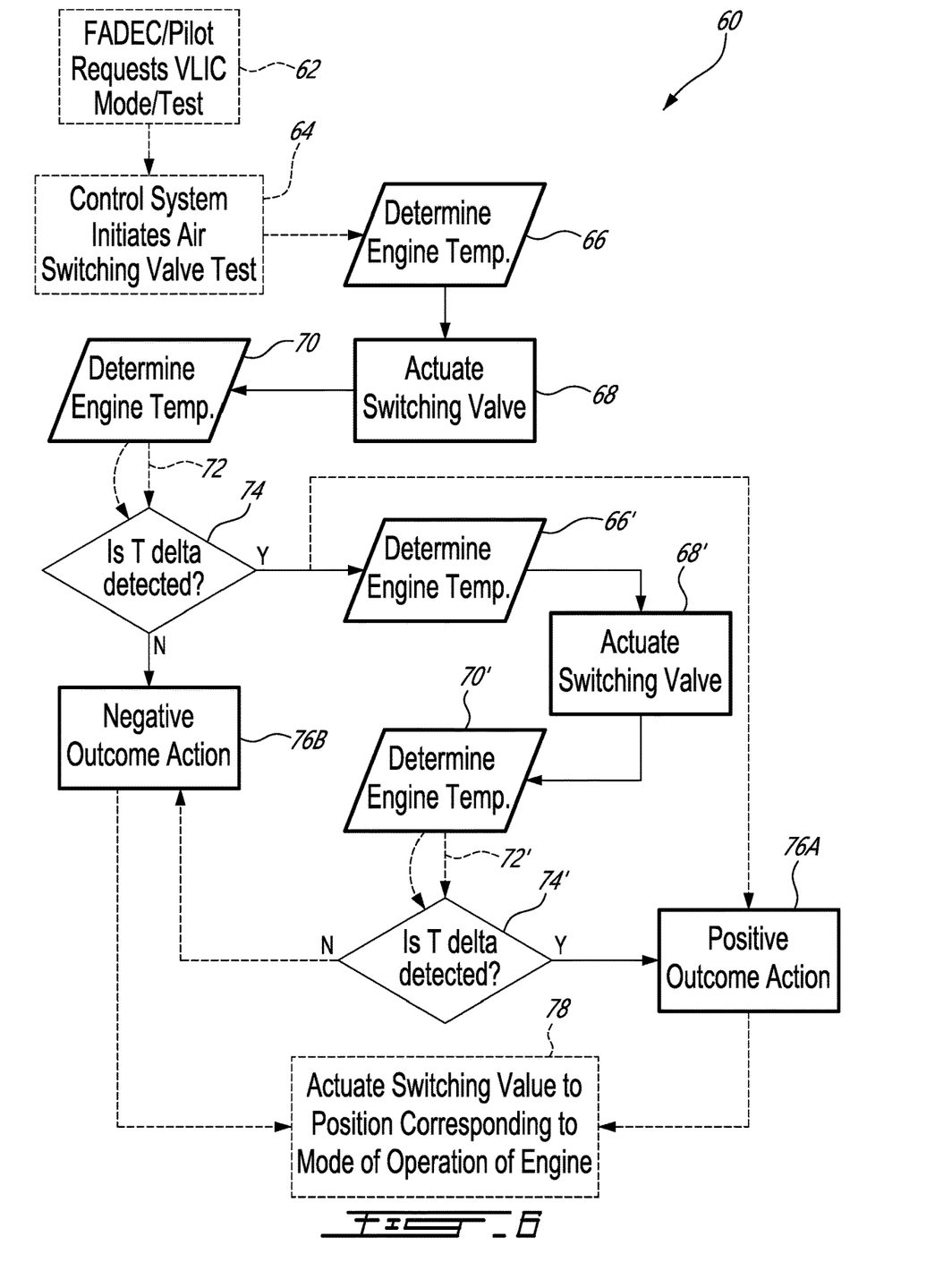
FIG. 6 is a flowchart illustrating steps of a method of providing bleed air from a first engine of the multi-engine aircraft to a second engine of the multi-engine aircraft, as described herein.

Referring to FIG. 6, there is shown a method 60 of providing bleed air from the first engine 1 of the multi-engine aircraft 1 of FIG. 1, to the second engine 2 of the multi-engine aircraft 1. In other applications and embodiments, the method 60 and/or various sequences that it may comprise may be applied with respect to other aircraft and/or bleed air system(s) of gas turbine engines. In the illustrated non-limiting embodiment, the method 60 may include a step 62 of receiving a command from an operator, such as a pilot, of the aircraft 1 requesting to switch for example the second engine 2 to the standby mode. In some embodiments, the step 62 may be performed when the second engine 2 is operating in the powered mode.

The method 60 may further include a step 64 of initiating a sequence, which may be referred to as a "switching valve test". In cases where the step 64 is performed when the second engine 2 is operating in the powered mode, the switching valve 14 may be in its powered position, in which the switching valve 14 supplies bleed air to the bleed air system 27, and hence to a plurality of parts of the second engine 2, from the low pressure air plenum 19. The low pressure air plenum 19 may be referred to as a first bleed location in/of the compressor section 9 of the engine 10. As an example, in some embodiments, the low pressure air plenum 19 may be fluidly connected to a point in between two or more rotors of the compressor section 9, upstream of an outlet of the compressor section 9, to receive bleed air from that point.

As shown, in some embodiments, the method 60 may include a step 66 of determining one or more operating parameters of the engine 10. In the present embodiment, the one or more operating parameters of the engine 10 is a single parameter, which is a temperature of the engine 10. More particularly, the temperature is in a main gas path (labeled at (AF) in FIG. 3) of the engine 10 at a location at or downstream of the combustor 8. The temperature may be determined/monitored using any suitable methods and/or sensor(s)/hardware selected to suit the particular application(s) and embodiment of the engine 10.

In this particular embodiment, the temperature is an inter-turbine temperature (ITT) determined at a location between at least two turbine rotors/turbines of the turbine section 5 as shown schematically in FIG. 3. The inter-turbine temperature (ITT) may be determined using any suitable method, for example such as described in the commonly owned U.S. patent application Ser. No. 16/551,161, filed on Aug. 26, 2019, entitled "SYSTEM AND METHOD FOR MONITORING TEMPERATURE OF A GAS TURBINE ENGINE", which is hereby incorporated by reference herein in its entirety. It is contemplated that the inter-turbine temperature (ITT) may also be determined using other methods, such as using a conventional one or more methods. In other embodiments, the temperature used in the method 60 may be a temperature taken downstream of the turbine(s) of the engine 10, such as an exhaust gas temperature (EGT) of the engine 10.

In the present embodiment, in response to and/or after determining the one or more operating parameters, the method 60 may proceed with a step 68 of actuating the switching valve 14 of the compressed air switching system 30. In the present example application, the step 68 actuates the switching valve 14 to bleed air from the high pressure air conduit 21. As an example, in some embodiments, the high pressure air conduit 21 may be fluidly connected to a point in, or simply to, an outlet of the compressor section 9, to provide a higher pressure bleed air than is available at low pressure inlet 18 of the switching valve 14 and the low pressure air plenum 19. Accordingly, the point at which the high pressure air conduit 21 fluidly connects to the outlet of the compressor section 9 may be referred to as a second bleed location in/of the compressor section 9 of the engine 10, which is downstream of the first bleed location relative to air flow (AF) (FIG. 3) through the compressor section 9. The first and second bleed locations and the air flow (AF) are shown schematically in FIG. 3.

More generally, step 68 may include actuating the switching valve 14 to switch the switching valve 14 between its powered position and its standby position. In the present embodiment since the sequence of the method 60 is executed when the engine 10 is operating in the powered mode, the switching valve 14 is actuated to switch from its powered position to its standby position. In other cases when for example the sequence may be executed when the engine 10 is operating in the standby mode, the switching valve 14 may be in its standby position, and may thus be actuated to switch from its standby position to its powered position.

In some embodiments, the method 60 may proceed with a step 70 (re)determining the one or more parameters of the engine 10, in this case the inter-turbine temperature (ITT), after actuating the switching valve 14 at step 68. As a non-limiting example, the step 70 may be executed in the same way as step 66. The method 60 may then proceed with a step 72 of monitoring for and/or determining a change in the one or more parameters associated with the engine 10, in this non-limiting embodiment the inter-turbine temperature (ITT). In other embodiments, the one or more parameters may include a rotational speed of one or more of the compressor(s) of the engine 10, and in a particular embodiment a speed of the core/high-pressure compressor 13.

In some embodiments, step 72 may include comparing the one or more parameters before and after the step 68 of actuating the switching valve 14 to determine change(s) in the one or more parameters. In the present embodiment, the step 72B may include determining a change in the inter-turbine temperature (ITT) that resulted from the step 68 of actuating the switching valve 14. In one embodiment, the change may be determined as a difference in the inter-turbine temperatures (ITT) determined before and after the step 68. In some embodiments where the rotational speed of one or more of the compressor(s) is used, the method 60 may include determining a change in the rotational speed of the core/high-pressure compressor 13 at or after actuating the switching valve 14, and may proceed based on whether or not the determined change meets a threshold change, the threshold change indicative of the switching valve 14 being functional.

The method 60 may thus further proceed with a step 74 of determining whether the change(s) is/are below a respective threshold(s) or meet the respective threshold(s), and in response to a result of the determination, executing one or more actions. In the non-limiting embodiment of the ITT being a monitored parameter, the step 74 may include determining whether the change in the inter-turbine temperature (ITT) that resulted from the step 68 of actuating the switching valve 14 exceeds a temperature change threshold. In this embodiment, the temperature change threshold may be a constant, such as 50 Fahrenheit (F) for example. In other embodiments the threshold(s) and/or range(s) may have a different magnitude, which may be selected to suit the particular embodiment and application of the engine 10 and the aircraft 10 for example, and/or which may be selected/adjusted live based on altitude, ambient air temperature, and/or Mach number.

As but one example, in embodiments where the rotational speed of one or more of the compressor(s) of the engine 10 is a monitored parameter, step 74 of the method 60 may include determining whether a change in one or more of the compressor(s) of the engine 10 that resulted from the step 68 of actuating the switching valve 14 exceeds a speed change threshold. The speed change threshold may be determined for example for each particular embodiment of the engine 10, by actuating the switching valve 14 while the engine 10 is operating and the switching valve 14 is known to be in a functional state, so as to determine a resulting speed change.

One or more iterations of such a procedure may be executed, and for example a mean or an average expected resulting speed change may be used as the in-situ expected change threshold. In some embodiments where the expected resulting change is adjusted for altitude, ambient air temperature, and/or Mach number, one or more expected changes may be determined at various different combinations of the one or more of the altitude, ambient air temperature, and Mach number. Respective ones of the expected changes/change ranges may then be used as the threshold(s) at respective in-situ conditions of the altitude, ambient air temperature, and/or Mach number. It is contemplated that interpolation may be used for example to adjust the in-situ threshold(s) for a "live" set of operating conditions of the engine 10/aircraft based on two or more "training/design stage" conditions for which respective thresholds corresponding to the valve 14 being functional were determined.

In some embodiments, a threshold range of an expected speed change may be determined for example, and the method 60 may thus include determining whether an in-situ change falls within the threshold range. In some embodiments, a result indicating that the in-situ change is below the threshold range may be taken to indicate that the switching valve 14 is in a malfunction state. In some embodiments, a result indicating that the in-situ change is above the threshold range may be taken to indicate that the switching valve 14 is in a malfunction state.

Similar procedure(s) may be used to determine threshold change(s) and/or threshold range(s) for each given one or more monitored parameters. Examples of other parameters which may be used instead of or in combination with the ITT and/or the EGT include one or more conditions (e.g. pressure and/or temperature) of air at an outlet of one or more compressor(s) of the engine 10, such as at an outlet of the high-pressure compressor 13. In some embodiments, a combination of such parameters may be monitored, with multiple determinations being made vis-à-vis respective threshold(s) and/or range(s).

In the present embodiment, the magnitude of the constant may be determined for example as an expected change in the inter-turbine temperature (ITT) that results from the step 68 of actuating the switching valve 14 when the switching valve 14 is known to be functional. In other embodiments and applications, the threshold may be a constant expected temperature change range, a variable expected temperature which may vary as a function of the operating condition of the engine 10 at which the method 60 is executed, or for example a variable range which may vary as a function of the operating condition of the engine 10 at which the method 60 is executed, and may be determined to suit each particular embodiment and application of the engine 10 and the aircraft 1.

In the present embodiment, the action(s) executed using the method 60 may include generating an indication that the switching valve is in a malfunction state and/or preventing the engine 10 from switching to the standby mode as shown at 76B, where, for example in the current embodiment, the change in the inter-turbine temperature (ITT) is determined to be below (i.e. determined to be less than) the threshold. In the present embodiment, the action may instead include generating an indication that the switching valve is in a functional state and/or allowing the engine 10 to switch to (i.e. enter) the standby mode as shown at 76A, where the change in the inter-turbine temperature (ITT) is determined to meet (i.e. determined to be equal to or greater than) the threshold. On the other hand, in some embodiments, in response to determining that the change in the parameter(s), in the present embodiment in the inter-turbine temperature (ITT), meets the threshold/range, another sequence may be executed before allowing execution of the step 76A.

In some embodiments, the sequentially next sequence may be similar to the sequence of steps 66, 68, 70, 72 and 74 described above. Accordingly, in FIG. 6, the sequentially next sequence is shown with respective numerals 66', 68', 70', 72' and 74', which depict another iteration of the steps 66, 68, 70, 72 and 74 described above. Thus, in such embodiments, the sequentially next sequence may include actuating 74' the switching valve 14 (in this non-limiting example, from its standby position back to its powered position), determining an additional resultant change in the inter-turbine temperature (ITT), and determining whether the additional resultant change in the inter-turbine temperature (ITT) meets a second threshold. The second threshold may be the same or different as the initial threshold. Thus, as shown in FIG. 6, in such embodiments the action 76A may be executed only after a determination that the additional resultant change meets the second threshold, and else, the action 76A may be executed.

Still referring to FIG. 6, depending on the embodiment and application of the method 60, the position to which the switching valve 14 may be after the actuation step(s) 68, 68' of the method 60 may not correspond to the mode of operation of the engine 10 that may be operating in and/or may switch to in the case of a positive outcome 76A of the method 60. That is, in the embodiments where the engine 10 is operating in the powered mode and the switching valve 14 is in the corresponding powered position, a command is received to switch the engine 10 to the standby mode, and the method 60 executes with both sequences 66-74 and 66'-74', the switching valve 14 would switch to its standby mode as a result of the first sequence 66-74 and then back to its powered mode as a result of the second sequence 66'-74'. Accordingly, where the second sequence 66'-74' provides indication for a positive outcome action 76A, which in this embodiment is switching the engine 10, or allowing the engine 10 to switch, to the standby mode, the switching valve 14 may need to be actuated to a position corresponding to the standby mode as shown at 78. In some embodiments, this subsequent actuating of the switching valve 14, where required, may be included as part of the positive outcome action 76A.

Referring back to FIG. 1B, in some embodiments, the aircraft 1 may include an air valve 14' in an air flow path (A) that fluidly interconnects the bleed air systems 27 of the engines 10 of the aircraft 1. The air valve 14' may be operable to fluidly block the air flow path (A) to fluidly isolate the bleed air systems 27 of the engines 10 of the aircraft 1 from each other, and to open the air flow path (A). In the present embodiment, the air valve 14' is operable to open an air flow path from the compressor section 9 of the first engine 1 to the bleed air system 27, and thus parts supplied thereby, of the second engine 2, when the second engine 2 is switched to or otherwise operated in the standby mode while the first engine 1 is operated in the powered mode. This may allow to supply bleed air from the powered engine 10 to the standby engine 10 so as to ensure proper functioning of the standby engine 10. Particular non-limiting embodiments of the air valve 14', the air flow path (A) and the associated possible operation thereof are described and shown in detail in U.S. patent application Ser. No. 16/560, 365, entitled "Control Logic for Gas Turbine Engine Fuel Economy", filed on Sep. 4, 2019, which is hereby incorporated by reference herein in its entirety.

Figure 7:
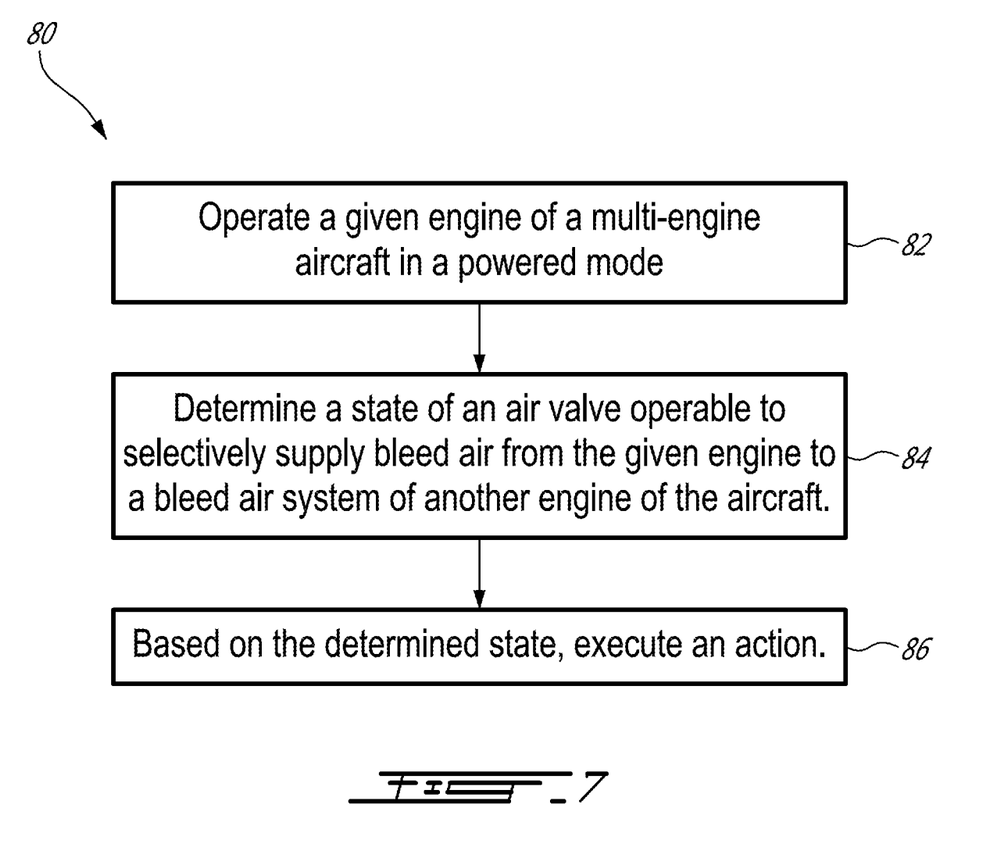
FIG. 7 is a flowchart illustrating steps of a method of determining a state of a switching valve, as described herein.

Still referring to FIG. 1, one or more embodiments of the method 60 may be executed to determine a state of the air valve 14' and/or execute one or more actions based on the determined state of the air valve 14'. To illustrate this, another embodiment of the method, method 80, is shown in FIG. 7. As an example, similar to the method 60, the control system 31 of the aircraft 1 may be configured to execute, and hence may execute, the method 80.

The method 80 may include a step 82 of operating a given engine, for example the first engine 1, of a multi-engine aircraft 1, such as the aircraft 1, in a powered mode to provide motive power to the aircraft 1. During this operation, the method 80 may include a step 84 of determining a state of the air valve 14'. In an embodiment, the step 84 may be performed by executing one or both of the sequences 66-74, 66'-74', and/or additional similar sequences and/or steps for example, described above with respect to the air valve 14', with the temperature and threshold against which the temperature is compared being those associated with the given engine from which bleed air is to be provided. More particularly, the temperature may be the inter-turbine temperature (ITT) of the given engine.

Accordingly, in the present embodiment, the method 80 may proceed with executing an action 86 based on the state of the air valve 14'/change of the inter-turbine temperature (ITT) determined using the sequence(s) 66-74, 66'-74' of step 82. More particularly, if the method 80 is executed in response to a command from for example a pilot of the aircraft 1 requesting to switch the second engine 2 into the standby mode, the method 80 may proceed with allowing the request and/or generating a "valve functional" indication, if at step 82 the ITT change was determined to exceed the threshold expected ITT change, for example 30F, associated with the first engine 1, and else disallowing the request and/or generating an indication of a malfunction state of the air valve 14'. In some embodiments, the step of disallowing the request may be executed by actuating the air valve 14' to fluidly seal the air flow path (A) and allowing no further actuation of the air valve 14' until the air valve 14' is fixed during maintenance or otherwise determined to be functional for example. As an example, in some embodiments, the indication may be displayed to the pilot via one or more suitable cockpit instruments.

The above description is meant to be exemplary only, and one skilled in the relevant arts will recognize that changes may be made to the embodiments described without departing from the scope of the invention disclosed. The present disclosure may be embodied in other specific forms without departing from the subject matter of the claims. The present disclosure is intended to cover and embrace all suitable changes in technology. Modifications which fall within the scope of the present invention will be apparent to those skilled in the art, in light of a review of this disclosure.

For example, one or more steps of the method 60 may be omitted, such as for example one or more of the steps 62 and 64 and/or the monitoring. As another example, while the methods 60, 70 described above may be used to effect changes in the operation of one or more engines 10 of a multi-engine aircraft 10, methods of the present technology, such as for example one or more sequences of the method 70 for example, may be executed separately with respect to a given one or more air valves of an aircraft to determine whether or not the one or more air valves are functional or not.

As another example, in some embodiments and applications, the step 84 of determining a state of the air valve 14' may be executed one or more times, for example manually and/or automatically via a suitable timer executing the step 84 at a pre-set frequency during operation of the aircraft 1. As an example, this may be done to monitor the state of the air valve 14' and to alert an operator of the aircraft 1 when the state of the air valve 14' is determined to be a malfunction state.

What is claimed is:

1. A method of operating a multi-engine system of an aircraft, the multi-engine system including a bleed air system in communication with a first engine and a second engine, the first engine and the second engine driving a common load, the method comprising:
    operating the first engine in a powered mode to provide motive power to the aircraft;
    operating the second engine in a standby mode wherein the second engine provides little to no motive power to the aircraft; and
    controlling the bleed air system by:
        actuating an air valve to open an air flow path to flow bleed air bled from a compressor section of the first engine to a secondary air system of the second engine, the secondary air system providing the bleed air to a plurality of parts the second engine for non-combustion purposes, the plurality of parts including at least a bearing of a core of the second engine,
        after the step of actuating the air valve, determining a change in a temperature in a main gas path of the first engine at a location in the main gas path at or downstream of a combustor of the first engine,
        determining if the change is below a threshold or if the change meets the threshold, and
        in response to determining that the change is below the threshold, executing an action with respect to the first engine, the air valve, and/or the second engine.

2. The method of claim 1, wherein the action includes actuating the air valve to fluidly seal the air flow path.

3. The method of claim 1, wherein the action includes generating an indication that the air valve is in a malfunction state.

4. The method of claim 1, wherein the action is a first action, and the method includes, in response to determining that the change meets the threshold, executing a second action with respect to at least one of the first engine, the air valve, and the second engine, the second action being different from the first action.

5. The method of claim 4, wherein the second action includes generating an indication that the air valve is in a functional state.

6. The method of claim 4, wherein the second action includes operating the second engine in a standby mode to provide less motive power to the aircraft than the first engine operating in the powered mode.

7. The method of claim 1, wherein the step of determining the change in the temperature includes determining the temperature prior to the step of actuating the air valve, determining the temperature after the step of actuating the air valve, and determining the change as a difference between the temperatures determined before and after the step of actuating the air valve.

8. The method of claim 1, wherein the first engine is a gas turbine engine and the temperature is an inter-turbine temperature of the gas turbine engine.

\* \* \* \* \*